US011865854B2

(12) United States Patent
Moon

(10) Patent No.: US 11,865,854 B2
(45) Date of Patent: Jan. 9, 2024

(54) CLIPBOARD FOR CONVENIENTLY FIXING DOCUMENT

(71) Applicant: Myung Hak Moon, Seoul (KR)

(72) Inventor: Myung Hak Moon, Seoul (KR)

( * ) Notice: Subject to any disclaimer, the term of this patent is extended or adjusted under 35 U.S.C. 154(b) by 0 days.

(21) Appl. No.: 18/124,125

(22) Filed: Mar. 21, 2023

(65) Prior Publication Data

US 2023/0234391 A1 Jul. 27, 2023

Related U.S. Application Data

(63) Continuation of application No. PCT/KR2021/012547, filed on Sep. 15, 2021.

(30) Foreign Application Priority Data

Sep. 23, 2020 (KR) ........................ 20-2020-0003468

(51) Int. Cl.
*B42F 9/00* (2006.01)
*B42F 11/04* (2006.01)
*B42F 1/12* (2006.01)

(52) U.S. Cl.
CPC ................ *B42F 9/001* (2013.01); *B42F 1/12* (2013.01); *B42F 9/00* (2013.01); *B42F 11/04* (2013.01)

(58) Field of Classification Search
CPC .. B42F 9/00; B42F 9/001; B42F 11/04; B42F 1/12

(Continued)

(56) References Cited

U.S. PATENT DOCUMENTS 5,212,850 A 5/1993 Rerolle
5,272,792 A * 12/1993 Harper ...................... B42F 1/12
24/67 CF (Continued)

FOREIGN PATENT DOCUMENTS

DE 10008436 A1 * 9/2001 ................ B42F 1/12
GB 558609 A * 1/1944

(Continued)

OTHER PUBLICATIONS

International Search Report of PCT/KR2021/012547 dated Dec. 29, 2021.

(Continued)

*Primary Examiner* — Kyle R Grabowski
(74) *Attorney, Agent, or Firm* — Dinsmore & Shohl LLP; Yongsok Choi, Esq.

(57) ABSTRACT

A clipboard includes a plate body formed to have a predetermined area to support document paper; and a clip portion extending from one corner of the plate body and fixing the document paper seated on the plate body to prevent the document paper from being separated from the plate body. The clip portion includes a second fixing member, a first fixing member extending from the second fixing member, and a third fixing member formed symmetrically with respect to a boundary surface between the second fixing member and the plate body; the second fixing member is configured to be folded with between the second fixing member and the plate body to cover the document paper; and the first fixing member is configured to be folded with respect to a boundary surface between the first fixing member and the second fixing member, so that the document paper can be fixed.

7 Claims, 6 Drawing Sheets

(58) Field of Classification Search
USPC .................................................. 402/500, 503
See application file for complete search history.

(56) References Cited

U.S. PATENT DOCUMENTS

| | | | | |
|---|---|---|---|---|
| 5,797,625 | A * | 8/1998 | Giulie ........................ | B42F 1/12 281/21.1 |
| 2006/0090303 | A1 * | 5/2006 | Woollard .................. | B42F 1/12 24/67 AR |
| 2007/0074377 | A1 | 4/2007 | Wu | |
| 2001/5009615 | | 4/2015 | Paulick et al. | |

FOREIGN PATENT DOCUMENTS

| | | | | |
|---|---|---|---|---|
| JP | H0683369 | U | | 11/1994 |
| JP | H11139059 | A | * | 5/1999 |
| JP | 2602305 | Y2 | * | 1/2000 |
| JP | 2019020435 | A | | 2/2019 |
| KR | 20130029629 | A | * | 3/2013 |

OTHER PUBLICATIONS

Office Action of KR Application No. 20-2020-0003468 dated Nov. 8, 2021.

* cited by examiner

CLIPBOARD FOR CONVENIENTLY FIXING DOCUMENT

CROSS REFERENCE TO RELATED APPLICATIONS

This is a continuation of International Application No. PCT/KR2021/012547 filed on Sep. 15, 2021, which claims priority to Korean Patent Application No. 20-2020-0003468 filed on Sep. 23, 2020, the entire contents of which are herein incorporated by reference.

BACKGROUND

Technology

The present invention relates to a clipboard for conveniently fixing document, and more particularly to a clipboard for conveniently holding a document by fixing the top of one side of the document through a clip portion formed in the clipboard.

Background Technology

Generally, when viewing a multi-page document paper, the document paper is held in one form to view the document. In this case, regardless of whether the document is printed in landscape or portrait orientation, most people hold the document paper by fixing it at the top of one side of the document paper.

In the above-described case, the most common method of securing the document paper is through a clip or stapler. Most people are used to viewing document paper by fixing the top of one side, but most clipboards are designed to fix the entire top or side of the document paper, or to fix the center part of the top or side of the document paper, which is inconvenient to view the document paper in a different way.

In addition, when fixing the document paper through the existing clipboard and fixing mechanism, marks are left on the document paper, or when the fixing mechanism must be removed, the fixing mechanism is not easily removed, and in some cases, the fixing mechanism must be removed by using a dismantling mechanism, which causes inconvenience when disposing of the document paper.

SUMMARY

Technical Challenges

The present invention aims to solve the above-mentioned problems of the prior art, and provides a clipboard for conveniently fixing document by fixing a document paper using a magnetic portion of a clip portion extending from a top one corner part of a plate body, so that damage to the document paper due to insertion of a clip or a clip mark is not left on the document paper.

Solutions To Challenges

A clipboard for conveniently fixing document according to one embodiment of the present invention, comprising: a plate body formed to have a predetermined area for supporting document paper; a clip portion extending from a first edge of the plate body, for fixing the document paper resting on the plate body so that the document paper does not fall from the plate body; wherein clip portion includes a second fixing member extending from the plate body, a first fixing member extending from the second fixing member, and a third fixing member formed symmetrically with respect to the second fixing member and a boundary with the plate body, the second fixing member being folded with respect to the boundary with the plate body to cover a first area of the document paper, and the first fixing member being folded with respect to the boundary with the second fixing member so as to prevent the second fixing member from floating, thereby fixing the document paper.

Further, the first fixing member, the second fixing member, and the third fixing member may each comprise a magnetic portion and a support member for supporting a magnet of the magnetic portion.

Further, the first fixing member and the second fixing member may comprise being formed as a polygon.

Further, the first fixing member and second fixing member may further comprise being formed as a triangle.

Further, the second fixing member may be configured to be a right-angled triangle, wherein one of the two sides forming the right angle is configured to abut the plate body.

Further, the clip portion may be formed by protruding a predetermined thickness.

Further, the second fixing member may be formed extending in a direction from the plate body, and the first fixing member may be formed in a direction perpendicular to the direction in which the second fixing member is formed extending, but when the second fixing member is folded to the front of the plate body, it may be folded relative to a boundary surface of the plate body and positioned at a rear of the plate body.

Further, the magnetic portion formed on each of the fixtures may be at least one.

Further, the magnetic portion may comprise a plurality of magnets, each of the magnets having a different size.

Furthermore, the magnetic portions of the first fixing member, second fixing member and third fixing member may be arranged such that, when the first fixing member and second fixing member are in the state of being folded to fix the document, the magnetic portions included in the first fixing member, second fixing member and third fixing member correspond to the same position as each other.

Effects of Invention

The clipboard according to one embodiment of the present invention is capable of fixing document paper through a clip portion extending from the top one corner, and the one corner can be fixed without fixing it through a conventional clip or stapler, thereby fixing the document paper more conveniently than the conventional method. In addition, it can provide convenience in writing on documents by supporting documents on a clipboard.

In addition, the clip portion of the clipboard can be made of steel material, and the plate body and the clip portion can be manufactured at once by injection molding or extrusion molding with the same material, so that the manufacturing cost can be lower than the conventional clipboard.

DETAILED DESCRIPTION

Figure 1:
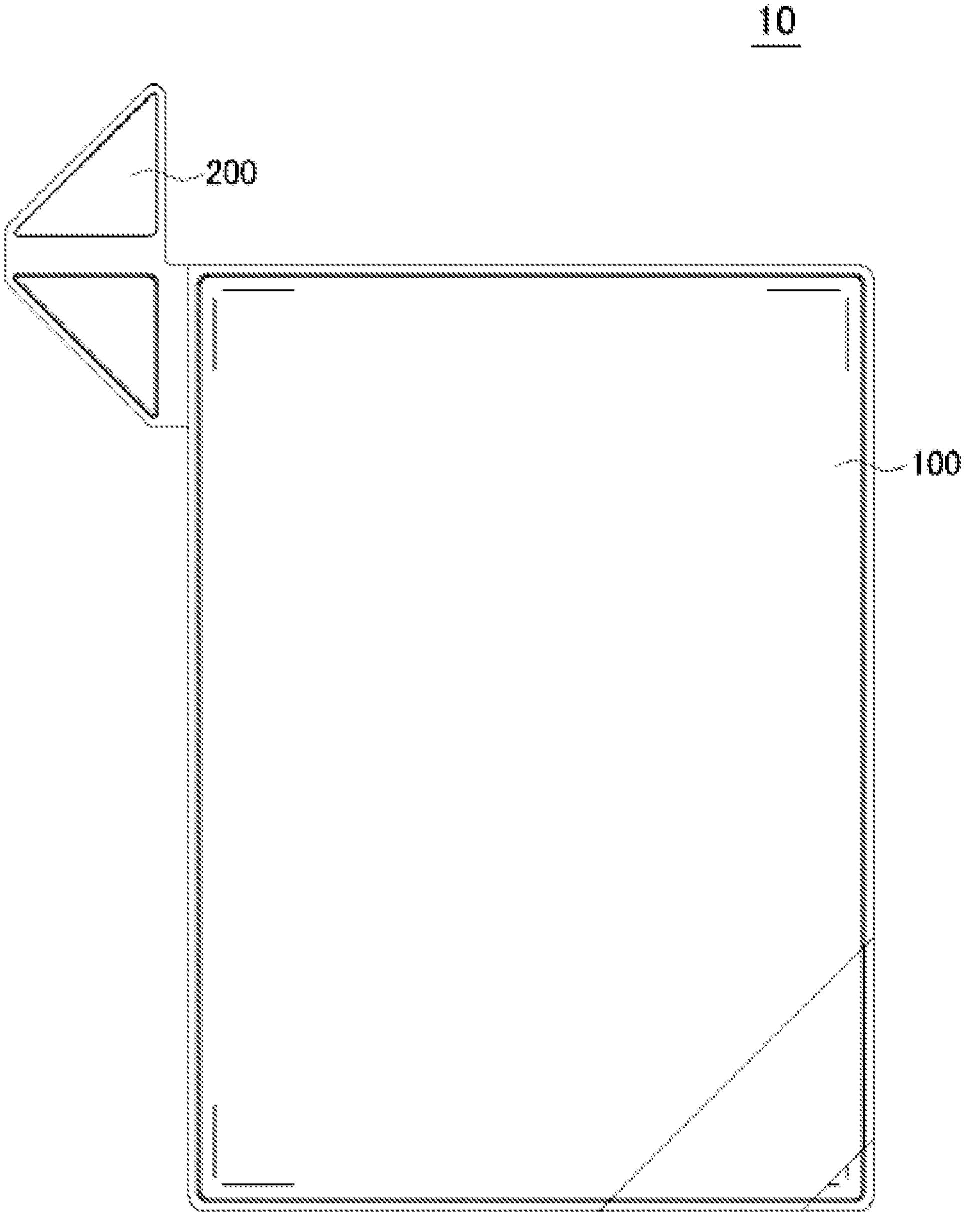
FIG. 1 is a front view of a clipboard according to one embodiment of the present invention.

Embodiments of the present invention are described in detail below with reference to the accompanying drawings to facilitate practice by one of ordinary skill in the art to which the present invention belongs. However, the invention may be implemented in many different forms and is not limited to the embodiments described herein. In order to clearly illustrate the invention in the drawings, parts not pertinent to the description have been omitted, and like parts throughout the specification have been designated by like drawing numerals.

Throughout the specification, when a part is the to “include” a component, it means that it may further include other components, not that it excludes other components, unless specifically stated to the contrary.

Hereinafter, a clipboard for conveniently fixing document 10 according to one embodiment of the present invention will be described in detail with reference to the accompanying drawings.

FIG. 1 is an overall drawing illustrating a configuration of a clipboard for conveniently fixing document 10 according to one embodiment of the present invention. Referring to FIG. 1, the clipboard 10 may be formed of a plate body 100 having a predetermined area for supporting document paper 500, and a clip portion 200 extending from a first edge of the plate body 100 to fix a document supported on the plate body 100 from falling off the plate body 100.

The clip portion 200 may include a first fixing member 210 extending from the plate body 100, a second fixing member 220, and a third fixing member formed on the plate body 100 symmetrically with respect to the second fixing member 220 and the boundary with the plate body 100.

Further, the clipboard for conveniently fixing document 10, including the plate body 100 and the clip portion 200, may be covered with a predetermined material. In a further embodiment, the clipboard 10, including the plate body 100 and the clip portion 200, may be covered with a material including leather or synthetic leather, but the material is not limited to these examples and various materials may be applied.

Figure 2:
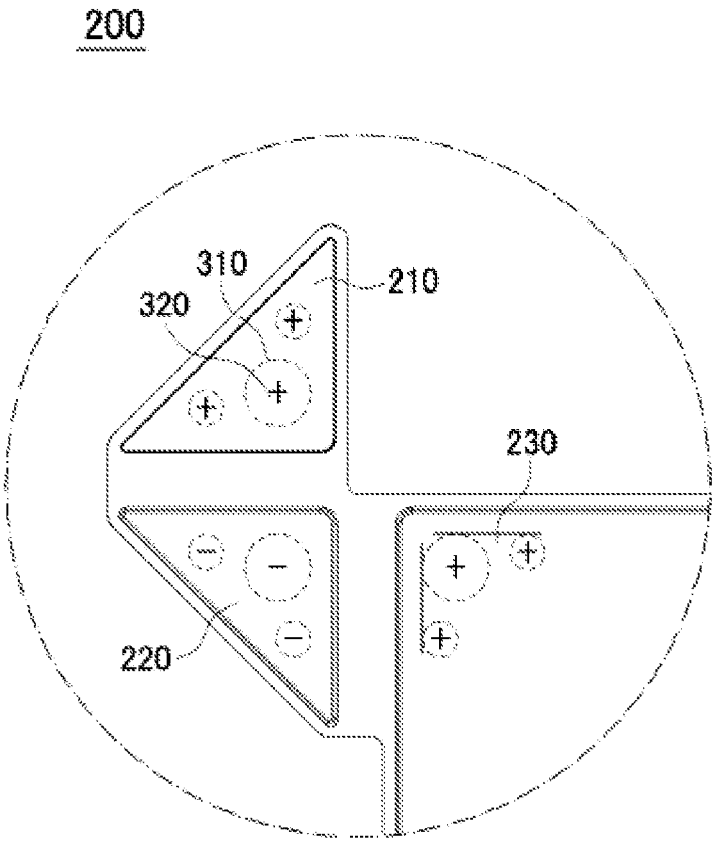
FIG. 2 is a partially enlarged view of a clip portion of a clipboard according to one embodiment of the present invention.

FIG. 2 is a partial enlarged view showing a clip portion 200 of a clipboard for conveniently fixing document 10 according to one embodiment of the present invention. Referring to FIG. 2, the clip portion 200 comprises a first fixing member 210, a second fixing member 220, and a third fixing member 230, each of which may be formed with a magnetic portion 310 and a support portion 320 supporting the magnetic portion 310.

In FIG. 2, the support portion 320 is illustrated by a dotted line, which shows an interior when the plate body 100 and the clip portion 200 are covered with a predetermined material.

The first fixing member 210 and the second fixing member 220 may be formed in the shape of a polygon, and are illustrated in the drawings in the shape of a triangle as one embodiment. In this case, the first fixing member 210 and the second fixing member 220 may be formed in the shape of a right triangle, and the second fixing member 220 may be configured such that any one of the two sides constituting the right angle abuts the plate body 100.

Further, the clip portion 200 and the plate body 100 may be formed by protruding by a predetermined thickness.

In this embodiment, each fixture includes at least one magnetic portion 310 and a support portion 320.

Furthermore, when formed with a plurality of magnetic portions 310, the size of each of the magnetic portions 310 may be configured differently from each other. In this case, a permanent magnet including neodymium may be used as the magnet of the magnetic portion 310 formed in each fixture. In addition, magnets may be disposed in the magnetic portion 310 in accordance with the direction of the N and S poles according to the direction in which each fixture is folded. As shown in FIG. 3C, when all of the fixing members are folded, the magnet of the third fixing member 230 may be positioned in the middle. Thus, the magnets may be arranged in consideration of the polarity of the magnetic portion 310 of the first fixing member 210 to the third fixing member 230.

Since the polarity of the magnetic portions 310 of the first fixing member 210 and the third fixing member 230 should face opposite to the polarity of the magnetic portions 310 of the second fixing member 220, the first fixing member 210 and the third fixing member 230 dispose magnetic portions 310 of the same polarity, the magnetic portion 310 of the second fixing member 220 may require placement of the magnetic portion 310 opposite to the polarity of the magnetic portion 310 of the first fixing member 210 and the third fixing member 230 .

Alternatively, any one of the first fixing member 210, the second fixing member 220 and the third fixing member 230 may include a magnetic portion, and at least one of the other fixings may include a ferrous material that adheres to the magnet.

Hereinafter, with reference to FIGS. 3A through 3C, the operation of the clip portion 200 according to one embodiment of the present invention will be described in detail.

Figure 3A:
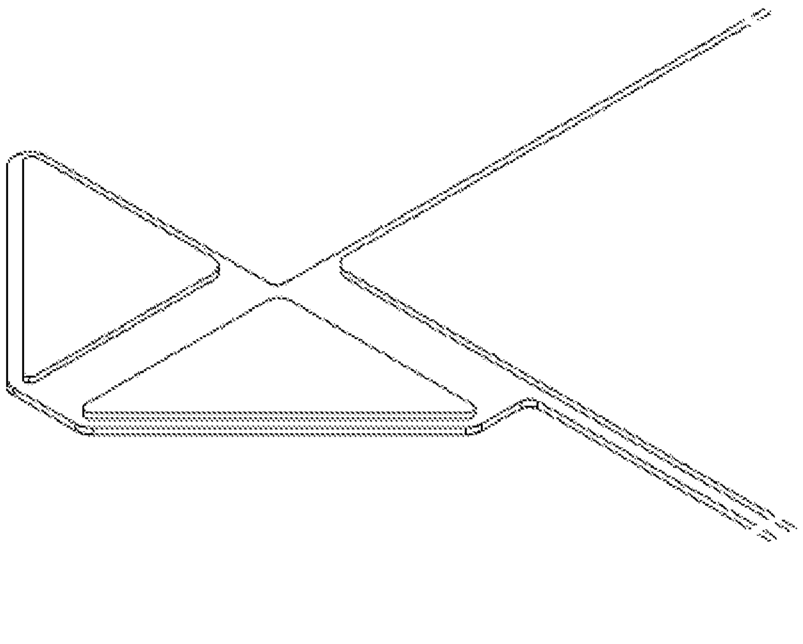
FIGS. 3A to 3C are drawings illustrating the operation of a clip portion according to one embodiment of the present invention.
Figure 3B:
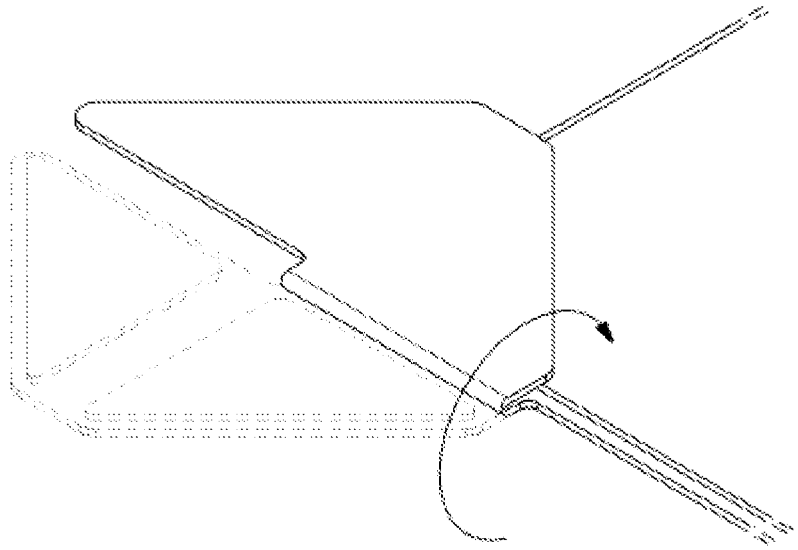
Figure 3C:
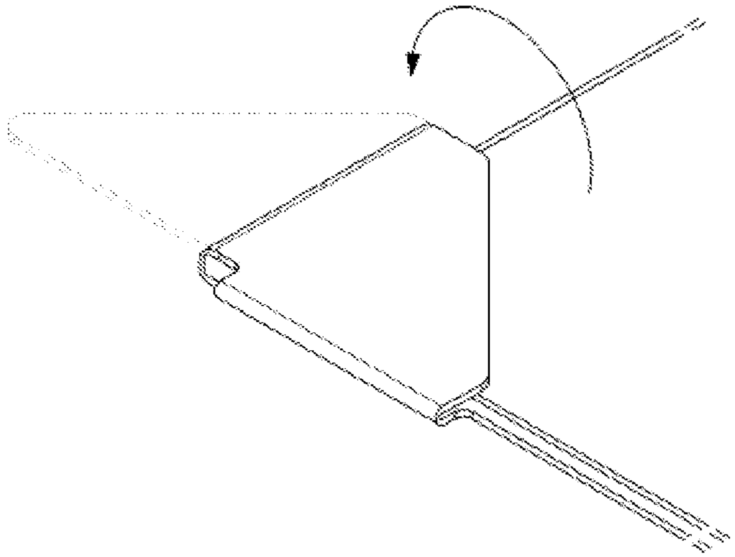

Comparing FIGS. 3A and 3B, the second fixing member 220, which is formed extending in a first direction from the plate body 100, can be folded and covered in the front direction of the plate body 100 relative to a boundary surface of the plate body 100, and can come into contact with the third fixing member 230. At this time, the magnetic portion 310 of the second fixing member 220 and the magnetic portion 310 of the third fixing member 230 correspond to the same position as each other, but when the document paper 500 is fixed, the document paper 500 may be positioned between the second fixing member 220 and the third fixing member 230 to be fixed by the magnet so that it does not fall off.

Comparing FIGS. 3B and 3C, in a state in which the second fixing member 220 and the third fixing member 230 are folded to meet, the first fixing member 210 is folded relative to the top boundary surface of the plate body 100 to meet the plate body 100, and the position of the magnetic portion 310 of the first fixing member 210 is positioned correspondingly to the position of the magnetic portion 310 of the third fixing member 230 so that the second fixing member 220 does not float and can be fixed.

As a further embodiment, it may be realized that the document paper is fixed on the clipboard according to one embodiment of the present invention even if only one of the magnetic portions 310 of the first fixing member 210 and the second fixing member 220 is present. For example, in the absence of the magnetic portion 310 of the first fixing member 210, the second fixing member is folded in the front direction of the plate body relative to the boundary surface of the plate body so that the second fixing member 220 and the third fixing member 230 come into contact, and the magnetic portion 310 of each is fixed correspondingly, so that the document paper can be fixed between the second fixing member 220 and the third fixing member 230.

Furthermore, if the magnetic portion 310 of the second fixing member 220 does not exist, when the second fixing member 220 is folded in the rearward direction of the plate body relative to the boundary surface of the plate body, the magnetic portion 310 of the first fixing member 210 and the magnetic portion 310 of the third fixing member 230 can be symmetrically aligned relative to the upper surface boundary surface of the plate body, In this case, when the first fixing member 210 is folded toward the upper surface boundary of the plate body, the magnetic portion 310 of the first fixing member 210 contacts the magnetic portion 310 of the third fixing member 230 in a position corresponding to the magnetic portion 310 of the third fixing member 230, so that the document paper can be fixed by sandwiching the document paper between the first fixing member 210 and the third fixing member 230.

Figure 4A:
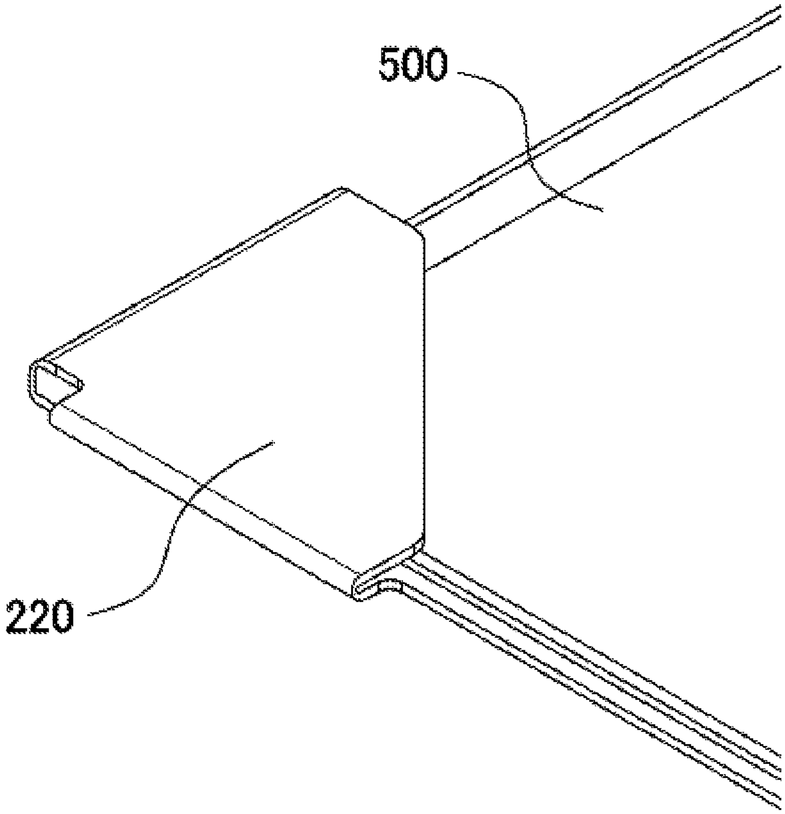
FIGS. 4A and 4B are drawings illustrating a clip portion having an orientation different from the orientation of the clip portion of the present invention, in accordance with a further embodiment of the present invention.
Figure 4B:
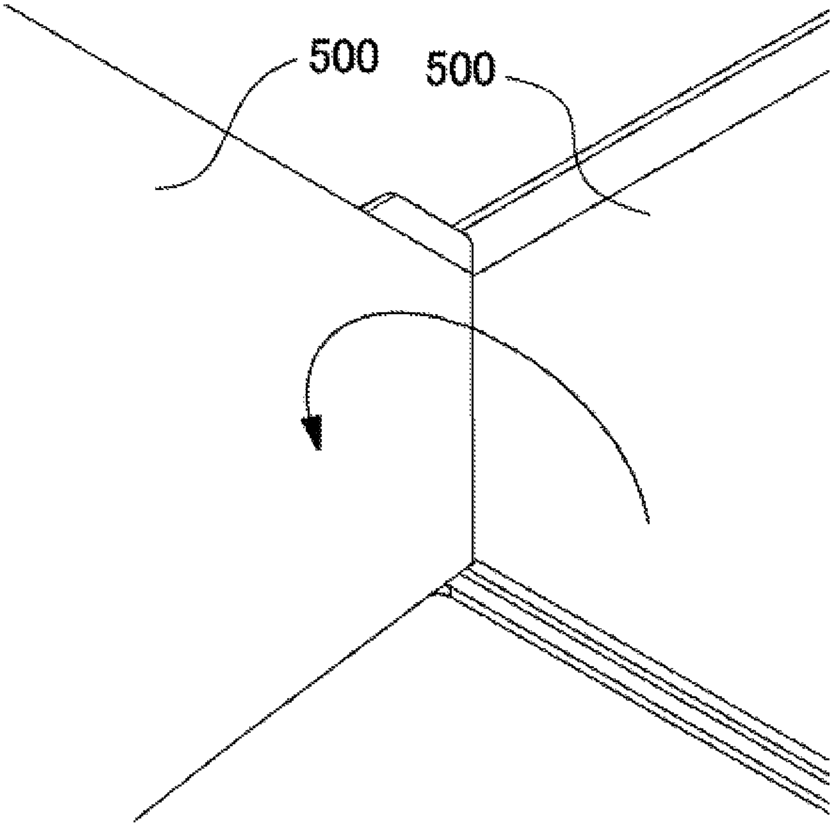

Furthermore, when the first fixing member 210 and the second fixing member 220 of the clipboard 10 according to one embodiment of the present invention are triangular, when the document paper 500 that is fixed is turned over, as shown in FIGS. 4A and 4B, the document paper 500 comes into contact with the sides of the second fixing member 220, so that the document paper 500 may not be damaged when the document paper 500 is turned over.

In a further embodiment, another document paper 500 can be additionally fixed between the first fixing member 210 and the plate body 100, so that two pieces of document paper 500 can be fixed on both sides of the clipboard 10 at once.

In a further embodiment, the plate body 100 may be formed by layering a plurality of plate-like materials. For example, the plate body 100 may be formed by layering a plastic plate material, including rigid PVC, with a laminate. In this case, the material used may not be limiting as long as it is implemented in a form that is capable of supporting document paper 500 in a plate-like form.

Figure 5:
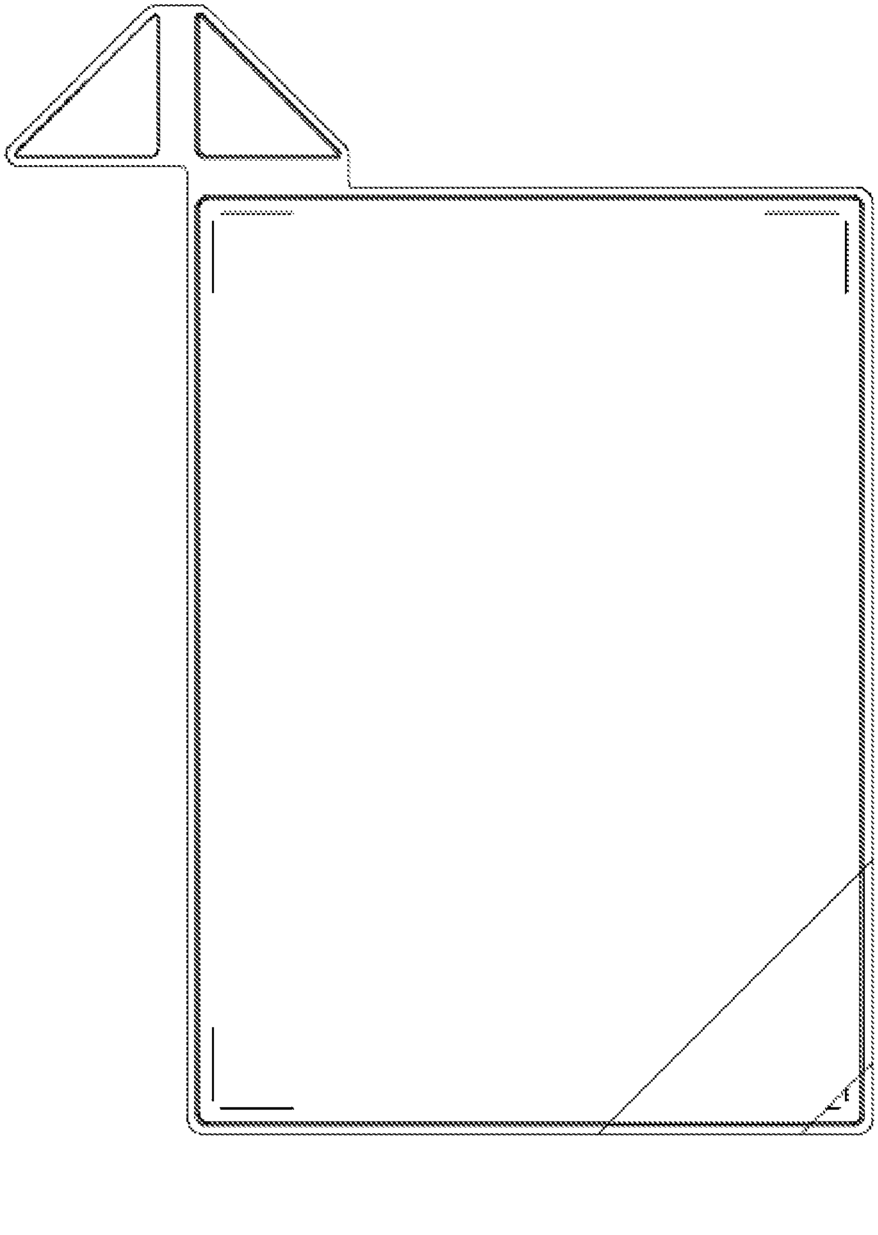
FIG. 5 is a front view of a clipboard according to another embodiment of the present invention.

In a further embodiment, described with reference to FIG. 5, the second fixing member 220 is formed extending in a direction away from the plate body 100, and the first fixing member 210 is formed in a direction perpendicular to the direction in which the second fixing member 220 is formed, such that when the second fixing member 220 is folded over the front of the plate body 100, it may be folded relative to a boundary surface of the plate body 100 and positioned at a rear of the plate body 100.

While the methods and systems of the present disclosure have been described with respect to specific embodiments, some or all of their components or operations may be implemented using computer systems having a general purpose hardware architecture.

The foregoing description of the invention is for illustrative purposes only, and one having ordinary knowledge in the technical field to which the invention belongs will understand that it can be readily adapted to other specific forms without changing the technical idea or essential features of the invention. It should therefore be understood that the embodiments described above are exemplary and non-limiting in all respects. For example, each of the components described in a single form may be implemented in a distributed manner, and similarly, components described as distributed may be implemented in a combined form.

The scope of the invention is indicated by the following claims rather than by the detailed description above, and the meaning and scope of the claims and all modifications or variations derived from the equivalents thereof shall be construed to be within the scope of the invention.

What is claimed is:

1. A clipboard, comprising:

A plate body formed to have a predetermined area for supporting document paper; and a clip portion extending from a first edge of the plate body to fix the document paper resting on the plate body from falling off the plate body; and wherein the clip portion comprises:

a second fixing member extending from the plate body, a first fixing member extending from the second fixing member, and a third fixing member defined in the plate body, the second fixing member is folded relative to a boundary with the plate body to cover an area of the document paper, the first fixing member is folded relative to a boundary with the second fixing member to fix the document paper such that the second fixing member is configured to not move, the first fixing member, the second fixing member and the third fixing member include a magnetic portion, the magnetic portion of the second fixing member and the magnetic portion of the third fixing member are formed at positions symmetrical to each other relative to a boundary surface of the plate body, the second fixing member is formed extending in a direction from the plate body, the first fixing member is formed in a direction perpendicular to the direction in which the second fixing member is formed extending, when the second fixing member is folded to a front of the plate body, the first fixing member can be folded relative to the boundary of the plate body to be positioned at a rear of the plate body, wherein any one of the first fixing member, second fixing member and third fixing member includes a magnetic portion, and at least one of other fixing members includes a ferrous material that adheres to a magnet, and wherein the magnetic portion comprises a plurality of magnets, and wherein at least two of the magnets are configured to have different sizes.

2. The clipboard according to claim 1, wherein the first fixing member, the second fixing member, and the third fixing member each include a magnetic portion and a support member for supporting a magnet of the magnetic portion.

3. The clipboard according to claim 1, wherein the first fixing member and the second fixing member comprise being formed as a polygon.

4. The clipboard according to claim 3, wherein the first fixing member and the second fixing member further comprise being formed as a triangle.

5. The clipboard according to claim 3, wherein the second fixing member is a right triangle, wherein one of two sides forming the right triangle is configured to abut the plate body.

6. The clipboard according to claim 1, wherein the clip portion is formed by protruding a predetermined thickness from the plate body.

7. The clipboard according to claim 1, wherein when the first fixing member and the second fixing member are folded to hold the document paper, the magnets of the first fixing member, the second fixing member and the third fixing member are arranged such that the magnets contained in the first fixing member, the second fixing member and the third fixing member correspond to the same position as each other.

* * * * *